UNITED STATES PATENT OFFICE 2,573,468

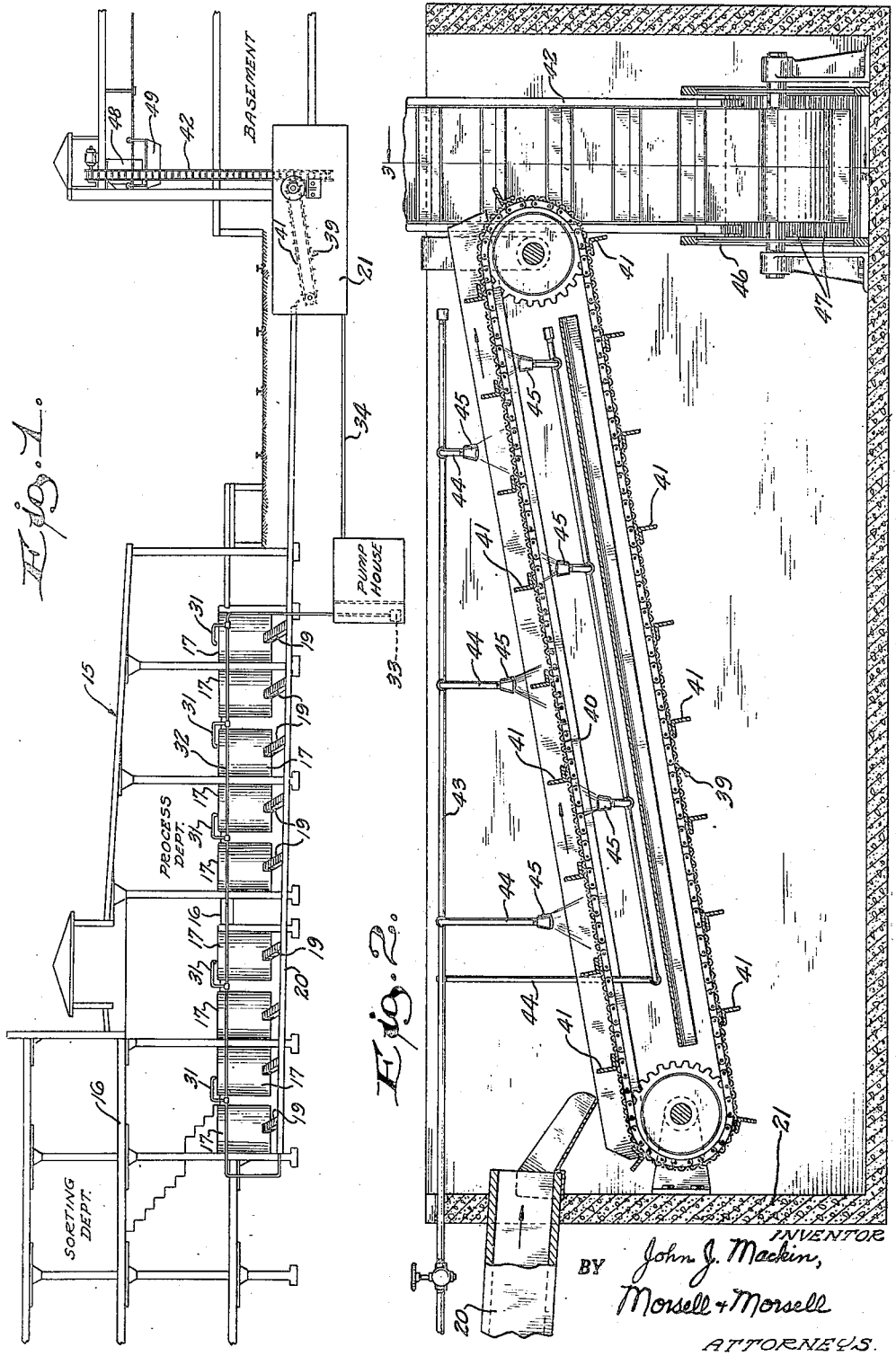

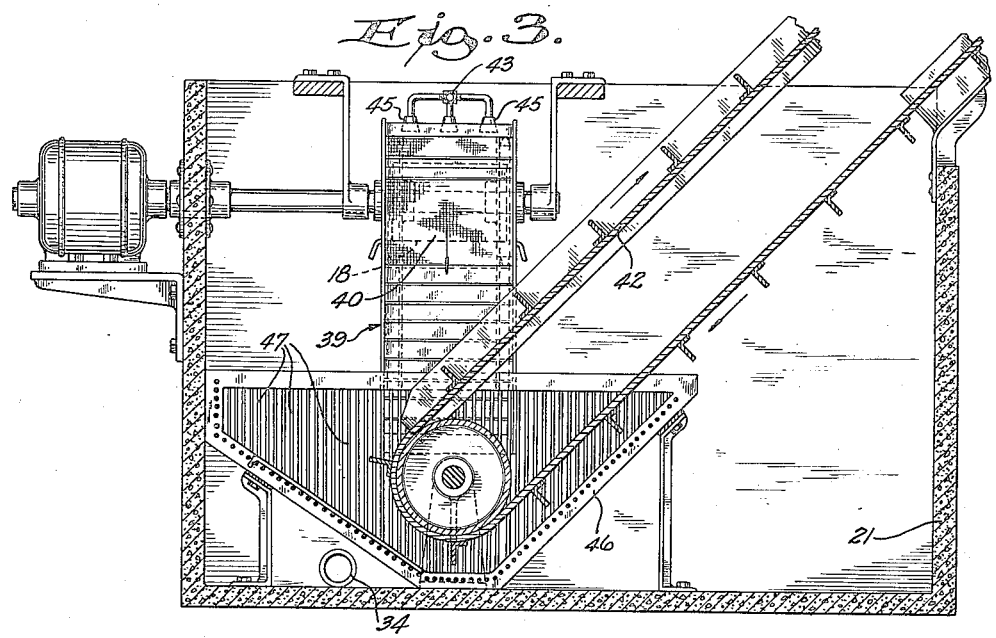
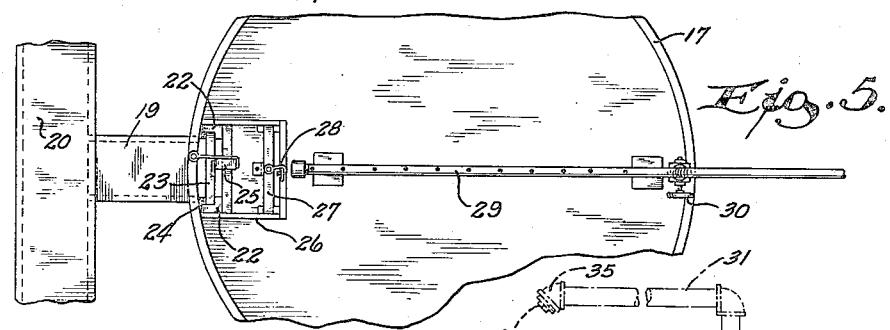
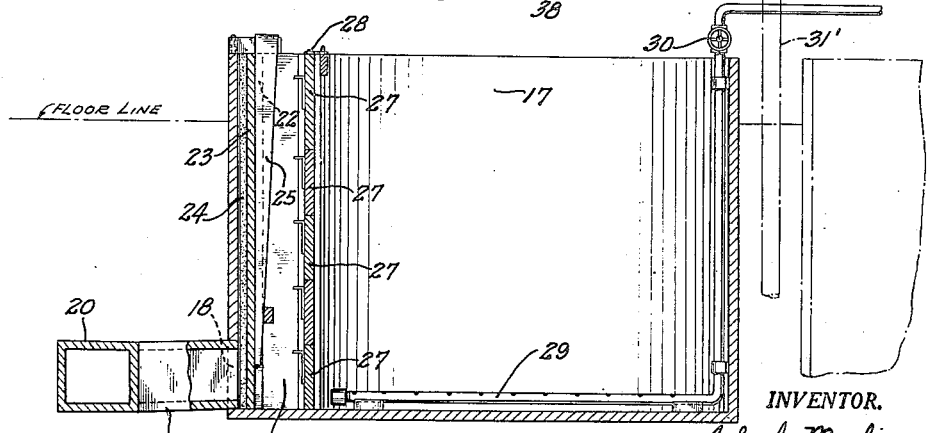

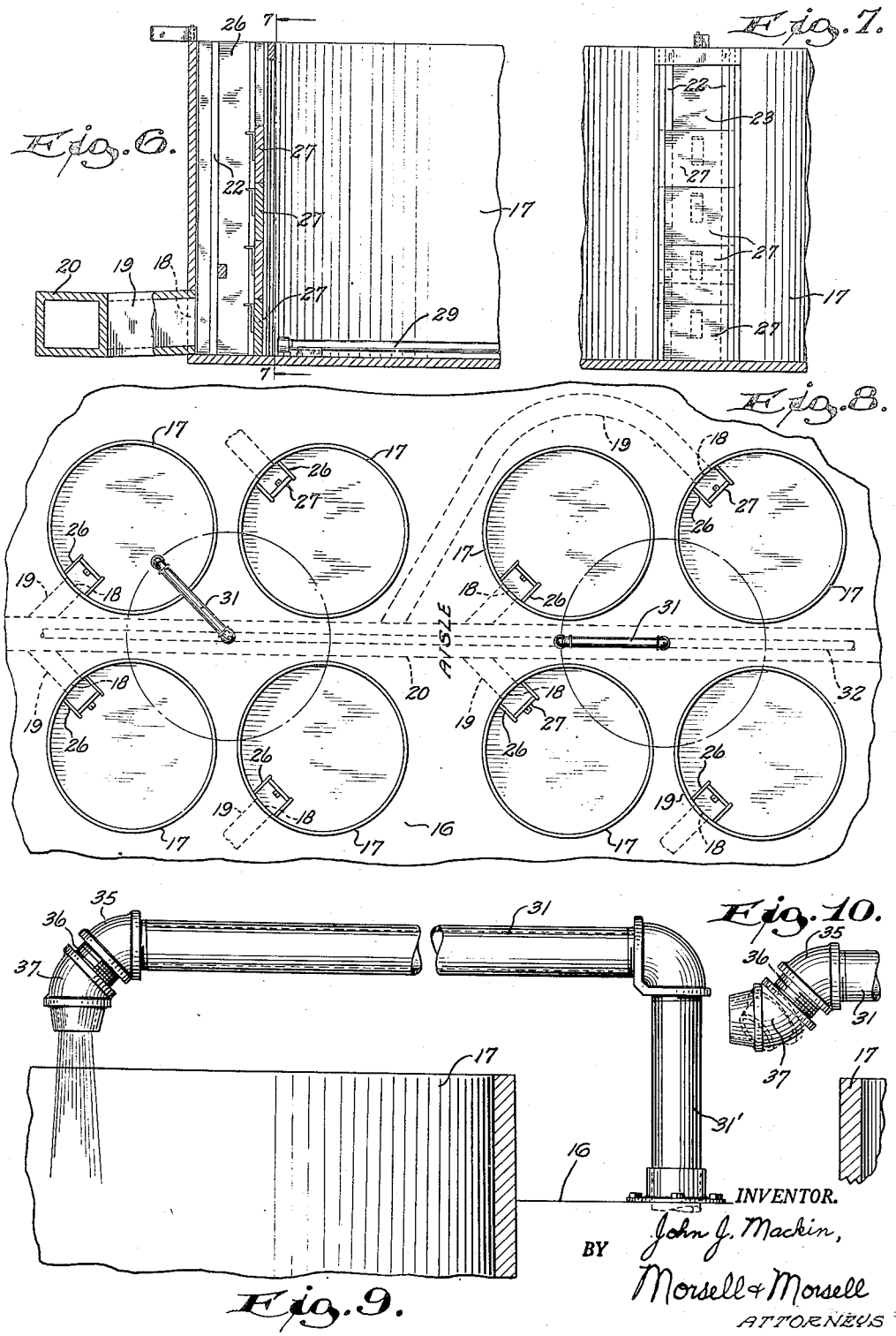

APPARATUS FOR PROCESSING PICKLED FOOD PRODUCTS

John J. Mackin, Green Bay, Wis., assignor to Green Bay Food Company, Green Bay, Wis., a corporation of Wisconsin Application May 24, 1947, Serial No. 750,327

2 Claims. (Cl. 302—14)

This invention relates to improvements in apparatus for processing pickled food products.

Due to the large quantities and bulk of vegetables which are being put through the various stages of a pickling process, a pickle processing plant is of necessity large and spread out, and bulky, cumbersome equipment is required which cannot be spaced for the most efficient staged operations to minimize transportation of the products being processed, as between various parts of the apparatus and stations. As an example of the problems normally involved, at several stages in the pickling process large quantities of the vegetable being treated are soaked in large vats or tanks containing a liquor. Ultimately it is necessary to remove the food products from these tanks and to transport the food products to a station or successive stations for further treatment or handling. It is now common practice to manually ladle the vegetables from the liquor in the tanks and deposit the same into conveyances which are manually or otherwise transported to another treatment station. The latter, due to the nature of the plant and other factors, may be far removed from the liquor tanks; so it will be appreciated that not only is the task of ladling the vegetables from the vats a slow, laborious and expensive undertaking, but the transportation of the removed vegetables from the tanks to a remote station is likewise laborious, time-consuming, and expensive.

With the above considerations in mind, it is therefore, a general object of the present invention to provide an improved apparatus for processing pickled food products which will eliminate the objections cited by providing for the automatic removal of food products from the processing tanks and hydraulic transportation of the same to remote processing stations, thereby minimizing the time required in these operations and saving manual labor.

A further object of the invention is to provide an improved apparatus for processing pickled food products wherein the liquor in the tanks in which the food products are being treated is used as the medium for conveying the products from the tanks to remote stations for subsequent treatment or sorting, with the liquor being salvaged and returned for subsequent use in the tanks.

A further object of the invention is to provide an apparatus for processing pickled food products which is efficient, which saves space and distances, and which permits of the utilization of desirable treatment steps at desired locations along the apparatus.

A further object of the invention is to provide an apparatus for processing pickled food products utilizing novel treatment tanks or vats equipped with regulatable means for controlling the discharge of the products, entrained in liquor, therefrom.

With the above and other objects in view, the invention consists of the improved apparatus for processing pickled food products, and all of its parts, combinations and steps, as set forth in the claims, and all equivalents thereof.

In the accompanying drawings in which the same reference characters indicate the same parts in all of the views, Fig. 1 is a semi-schematic side view of the improved pickle processing apparatus as installed in a plant;

Fig. 2 is an enlarged longitudinal vertical sectional view through the liquor salvaging tank at the far end of the apparatus showing a conveyor on which the pickles are discharged from a flume with the conveyor discharging onto an elevator which transports the pickles to a station for further handling or sorting;

Fig. 3 is a transverse sectional view taken on line 3—3 of Fig. 2;

Fig. 4 is an enlarged vertical sectional view of one of the pickle processing tanks or vats showing a vertical control chimney therein with the outlet opening to a branch flume being closed and with all of the discharge control gates in the chimney being in mounted and closed condition;

Fig. 5 is a fragmentary plan view of the showing in Fig. 4;

Fig. 6 is a fragmentary vertical sectional view of the processing tank or vat only showing the tank outlet open and one of the upper gates of the vertical chimney removed;

Fig. 7 is a fragmentary vertical sectional view taken on line 7—7 of Fig. 6;

Fig. 8 is a fragmentary plan view, on a smaller scale, of a group of processing tanks or vats arranged relative to a common flume and showing the manner in which a group of tanks may be serviced by a single pivotally mounted supply and agitating pipe;

Fig. 9 is an enlarged fragmentary detail sectional view showing a supply and agitating pipe in relation to a tank and provided at its outlet end with a universally adjustable discharge nozzle; and Fig. 10 is a fragmentary detailed view showing how the discharge nozzle on the outer end of the supply and agitator pipe may be adjusted for directional discharge.

Throughout the specification and in the claims wherever the term "pickle" or any derivative thereof is used, it is intended that this term imply and include such food products as cucumbers, cauliflower, pimento, onions, beets, watermelon rind, or any other foodstuffs or vegetables of a similar nature susceptible of being subjected to a pickling process. Also, with reference to the liquid in the processing tanks or vats and which also serves as the hydraulic medium for transporting the pickles from the vats, wherever the term "liquor" is used, it is intended that this term imply and include a brine solution, water which may be used for bathing, soaking or cleansing the pickles, or any other liquid in which the pickles are submerged for treatment.

Fig. 1 represents semi-schematically the improved apparatus for processing pickled food products as installed in a building or enclosure. It should be understood that the arrangement shown is merely by way of illustration and is susceptible of modification to suit various building or enclosure conditions. The apparatus is, however, bulky and spread out, and in some instances, portions thereof may extend into several levels of the building or plant. In Fig. 1, for instance, the enclosure, constituting a portion of the building or plant in which the apparatus is installed, is designated generally by the numeral 15 and may include several vertically spaced floor levels 16. In the main lower floor level 16 there are arranged a plurality of conveniently grouped processing tanks or vats 17 which are of relatively large capacity and in the embodiment shown in Fig. 1, said tanks or vats project above the floor level 16 and depend substantially therebelow. While the tanks or vats have been illustrated as being of cylindrical formation, the same may, within the scope of the present invention, be of any desired shape, and the upper end of the same are open.

One of the processing tanks 17 will now be rescribed in detail as the specific construction of the tank is an important aspect of the invention. By particular reference to Figs. 4, 5, 6 and 7, it will be observed that within the lower portion of a tank 17 there is a relatively large discharge or outlet opening 18 from which extends a branch flume 19 which communicates with a main flume or header 20. In a typical plural tank installation such as that depicted in Fig. 1, the main flume or header 20 is downwardly outwardly inclined and the branch flumes 19 leading from all of the tanks 17 to the main flume are also downwardly outwardly inclined so that gravity will insure a forceful flow of fluid therethrough. Also, in a typical installation, it will probably be convenient to have the flumes 19 and 20 below the main floor line 16 so that the outer end of the header 20 may discharge into a large capacity brine or liquid collection pit 21 (see Fig. 1). Within a tank 17, on each side of the discharge opening 18 are vertical shouldered keeper strips 22 which slidably receive a vertical gate 23. The latter, when in its mounted position shown in Fig. 4, closes the outlet opening 18 of the tank 17, bearing against gasket strips 24 and being retained in its closing position by a vertical wedge 25. Within the tank 17 and surrounding the outlet opening 18 and closure gate 23 is a vertical box-like enclosure forming a chimney 26. The innermost vertical wall of the chimney 26 is formed of channelled guides to receive a plurality of vertically superimposed removable doors 27. Each door 27 is weighted, and the uppermost door carries a latch mechanism 28 in order to retain the doors in their mounted positions against upward dislodgment by the buoyancy of the liquor in the tank 17. When it is desired to retain the liquor in a tank 17, the arrangement is as disclosed in Fig. 4 with the outlet control gate 23 in its mounted closing position and with all of the chimney doors 27 in superimposed closing relation. The chimney construction provides for controlled discharge of a desired amount of liquor and foodstuffs entrained therein from the tank 17 down to any predetermined level. For instance, if, as is shown in Figs. 6 and 7, the outlet opening control gate 23 be completely removed and the uppermost chimney door 27 be removed then, if there was a liquid level in the tank over the elevation of the remaining doors the liquid will cascade over the uppermost of the remaining doors 27 and downwardly through the chimney 26 and will discharge from the tank through the outlet opening 18 with such controlled discharge containing until the liquid level drops below the top of the uppermost remaining door 27. If additional discharge of liquor is desired, then the next door 27 is removed, and so on. However, with the gate 23 in its closing position and with the chimney doors 27 all mounted, the tank 17 is sealed against discharge and the pickle products or foodstuffs therein can be retained in a full tank of liquor for any desired period of treatment or processing.

It will be noted that within the lower portion of each tank 17 there is a pipe 29 having discharge orifices therein and the pipes for each of the tanks 17 may connect with a supply header (not shown) and be supplied with steam which when emitted into a tank of liquor serves to heat the liquor or cook the products therein. The steam pipe 29 for each tank may be controlled by a hand valve 30.

In a plural tank installation the various tanks 17 are conveniently grouped, as is shown in Fig. 8, and a liquid supply and spray pipe 31 is arranged relative to four tanks so that it may be swivelled or turned circularly on its upright portion 31' in a manner to serve four tanks 17. The upright portions 31' of the supply pipes 31 extend through the floor line 16 and all connect with a supply header 32 whose relationship to the entire assemblage is best shown in Fig. 1. The supply header 32 has its inner end connected with a pump 33 and through a return pipe 34, also in the circuit, brine or liquor which is collected in the pit 21 from the discharge end of the flume 20, is recirculated through the supply header 32 and circularly adjustable supply and spray pipes 31 for the individual tanks. Liquor discharged from the nozzle end of each supply pipe 31 can be forcefully directed into a tank 17 to replenish the liquid therein and to also agitate the contents of the tank to keep the pickle products in the liquid stirred up and floating so that the same will cascade with the liquor over a chimney door 27 when a discharge is being effected. Liquor flow through any of the supply pipes 21 may be valve controlled (not shown).

Any practical form of universally adjustable discharge nozzle may be used at the discharge end of a liquid supply and spray pipe 31. An efficient arrangement for this purpose is disclosed in Figs. 9 and 10 wherein the outer end of a pipe 31 has fast thereon an elbow coupling 35 which also carries a threaded pipe stem 36. The outer end of the pipe stem 36 has threaded thereon an elbow-shaped discharge spout 37. By turning the latter on the stem 36 any desired angular relationship of the discharge nozzle to the pipe 31 may be attained so as to direct a forceful stream of discharged liquid into a desired portion of a tank 17. By pivotally swinging the pipe 31 and varying the adjustment of the nozzle 37, all portions of a tank may be kept agitated by the liquid discharged thereinto, and as before mentioned, the pipe may be swung circularly from one tank 17 to any other tank positioned within the arc of movement of the pipe 31. If it is desired to seal off the discharge end of a pipe 31, to prevent drippage or for any other reason, the stem 36 and nozzle 37 may be removed and a plug 38 (see Fig. 4) may be threaded into the elbow 35.

In the installation depicted in Fig. 1, the tanks or vats 17 may be used for treating pickles which have already been soaked in brine and which have been sorted as to size and quality. In this event, the tanks 17 may contain fresh water for the purpose of removing the salt from the pickle products being soaked therein. Assuming that pickle products in some of the tanks 17 have been soaked sufficiently long and it is desired to transport the same to other stations in the plant for further treatment and processing, then it is necessary to remove the desired quantity of pickle products from the tanks and transport the same a substantial distance through the plant to the next station. With the improved apparatus, this is accomplished very easily and through the utilization of an hydraulic transportation medium, the hydraulic medium being the liquid in the tank or tanks from which contents are to be discharged. A selected tank or tanks then have the outlet opening gates 23 removed and a suitable number of chimney doors 27, from the top down are removed. Thereupon, with reference to the tank or tanks being discharged, the liquid with pickle products entrained therein will cascade over the uppermost door 27 remaining in the chimney, will flow down the chimney through the branch flume 19 and into the main flume 20. As was heretofore pointed out, the lower end of the main flume 20 discharges into the liquid collection pit 21 and installed in this is an endless conveyor 39 formed of a foraminous belt 40 and spaced transverse flights 41. The liquid carrying the pickle products passes through the foraminous belt 40 and collects within the pit 21 to be pumped therefrom through the pipe 34, as was heretofore mentioned. The solid material comprising the food products being processed are caught by the flights 41 on the upper extent of the belt 40 and are propelled toward the outer end of the conveyor which discharges onto an elevator 42. Extending into the pit 21 is a valve-controlled fresh water supply pipe 43 arranged with depending branches 44 and spray nozzles 45 positioned so as to spray fresh water against and through both the upper and lower surfaces of the top extent of the belt 40 to thoroughly wash the food products being transported by the conveyor. Within the pit 21 below the discharge end of the conveyor 39 and also below the receiving end of the elevator 42 there is a dished framework 46 which carries a plurality of spaced rods 47 and serves as a sieve to catch and salvage any food products which are not caught by the conveyor and elevator flights and fall free of the elevator. As will be observed from Fig. 1, the upper end of the elevator 42 is adapted to discharge its contents into a hopper 48 which discharges into a wheeled carrier 49 or other mechanical conveyance which will transport the pickle products to some other location or station within the plant for further processing or handling.

It will be evident from the foregoing that the improved apparatus for processing pickled food products is adaptable to plants or installations wherein distance between processing or handling stations is a factor. The laboriousness of ladling the solid products from the tanks 17 and manually or mechanically transporting them to remote stations in the plant is entirely eliminated and the apparatus and process makes use of the vat contained processing or cooking liquid as an hydraulic medium for removing the treated pickle products from the tanks and transporting the same to remote points. The liquid is salvaged and recirculated and the apparatus and method lend themselves to large scale commercial operations wherein continuous functioning of the apparatus can be attained. The returned and recirculated liquid is used to replenish the liquid in the tanks 17 and it may be discharged into the tanks through the adjustable nozzles 37 in a manner so as to keep the contents of a tank thoroughly agitated. Due to the convenient grouping of the tanks 17, a single supply pipe 31 may be operated so as to service a plurality of tanks.

The construction of the tanks 17 is very important and a factor in the success of the present invention. The arrangement permits the efficient sealing of the tank discharge opening 18 when it is desired to retain the liquor therein for a substantial length of time, and the chimney construction with the removable superimposed doors 27 permits a tank to be discharged down to any selected level.

Various changes and modifications may be made in the improved apparatus without departing from the spirit of the invention, and all of such changes are contemplated as may come within the scope of the claims.

What is claimed as the invention is:

1. In a processing tank adapted to contain a buoyant liquid with solid products in suspension therein, said tank having a discharge opening in a lower side wall portion thereof, a gate for said discharge opening, a vertical enclosure within the tank surrounding said discharge opening, one of the walls of the enclosure having removable doors therein which are selectively removable to bring the top level of said wall below the level of liquid in the remainder of the tank, and hydraulic means for agitating the contents of the tank to cause liquid with suspended solid products therein to cascade over the uppermost door in said enclosure and therefrom and for replenishing the liquid in the tank.

2. In a processing tank adapted to contain a liquid with solid products submerged therein, said tank having a discharge opening in a lower side wall portion thereof, a gate for said discharge opening, a vertical enclosure within the tank surrounding said discharge opening, one of the walls of the enclosure having removable doors therein which are selectively removable to bring the top level of said wall below the level of liquid in the remainder of the tank, hydraulic means for agitating the contents of the tank during discharge therefrom and for replenishing the liquid in the tank, said hydraulic means including a liquid-carrying pipe swingably mounted relative to the upper end of said tank, and a universally adjustable discharge nozzle on the outer end of said pipe.

JOHN J. MACKIN.

REFERENCES CITED

The following references are of record in the file of this patent:

UNITED STATES PATENTS

| Number | Name | Date |
|---|---|---|
| 1,838,290 | Steckel | Dec. 29, 1931 |
| 2,162,415 | Allen | June 13, 1939 |

FOREIGN PATENTS

| Number | Country | Date |
|---|---|---|
| 565,861 | Germany | June 12, 1931 |